UNITED STATES PATENT OFFICE.

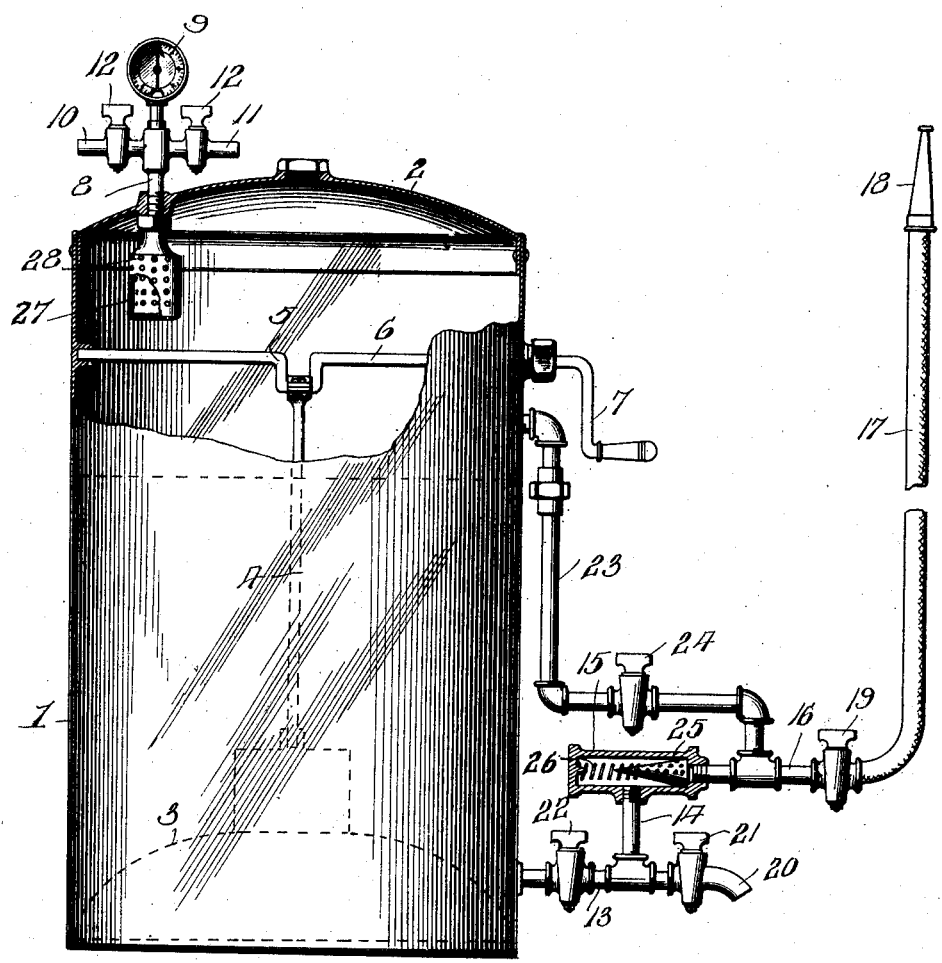

ELI F. KAUFFMAN, OF YORK, PENNSYLVANIA.

INSECT-DESTROYER.

No. 901,348.　　　Specification of Letters Patent.　　　Patented Oct. 20, 1908.

Application filed January 26, 1907. Serial No. 354,340.

*To all whom it may concern:*

Be it known that I, ELI F. KAUFFMAN, a citizen of the United States, residing at York, in the county of York and State of Pennsylvania, have invented new and useful Improvements in Insect-Destroyers, of which the following is a specification.

This invention relates to spraying devices or atomizers of the type disclosed in my prior application, Serial No. 302,699, filed Feb. 24, 1906, and which are designed especially for use in spraying trees, plants or the like with liquid to destroy insects.

The device embodies in its organization a tank or reservoir adapted to receive the liquid to be sprayed and containing an agitating member, said tank, which is equipped with suitable spraying nozzles, being designed for connection with a gas cylinder from which gas is supplied to the liquid contents of the tank.

The present invention has for its object to provide a straining device in the pipe that supplies the germicide liquid to the spraying nozzle, in connection with means for conveniently cleaning the strainer, as occasion requires.

With these and other objects in view, the invention comprises the novel features of construction and combination of parts more fully hereinafter described.

In the accompanying drawing, there is shown a side elevation partly in section of a spraying apparatus embodying the invention.

Referring to the drawing, 1 designates a vessel or tank provided with a cover 2 and containing a vertically movable dome-shaped agitator 3 connected by a pitman rod 4 with the crank portion 5, of a transversely-extending rotary crank shaft 6 journaled in suitable bearings in the tank and provided at one end exterior of the tank with an operating handle 7, there being tapped through a suitable opening in the cover 2, an inlet pipe 8 equipped with a pressure-gage 9 and having a branch pipe 10 and blow-off nozzle 11 controlled respectively by suitable valves 12. The pipe 10 is adapted in practice to be connected by a suitable tube or duct with a carbonic acid gas container (not shown), as in the instance of my prior apparatus.

The foregoing parts are preferably similar in construction and operation to the corresponding parts as disclosed in the above-noted application, but may, of course, be of other suitable or preferred construction and operation.

Coupled to the tank 1 and for communication therewith at the point adjacent its lower end is a discharge pipe 13 provided between its ends with a vertically uprising portion or section 14. This section carries at its upper end a horizontal tubular portion or casing 15 closed at its rear end and having tapped into its forward end a pipe section 16 which opens at its rear end into the casing. To the forward end of the pipe section 16 is coupled a flexible spraying tube 17 provided at its free end with a spraying nozzle 18, there being arranged in the pipe section 16 at a point near its outer end a controlling valve 19. Arranged in the discharge pipe 13, which terminates at its outer end in a discharge cock 20, is a pair of controlling valves 21 and 22 disposed respectively at opposite sides of the point of connection of pipe 14 with the discharge pipe.

Connected at its upper end for communication with the tank 1 at a point above the maximum level of the liquid therein is a branch pipe or duct 23 provided between its ends with a controlling valve 24 and having its lower end coupled to and for communication with the pipe section 16 at a point in rear of the valve 19, while arranged in the casing 15, to cover the opening or port leading to the pipe section 16, is a perforate shield or strainer 25 preferably of conical form as shown, and having its larger end arranged to bear against the front wall of the casing, the shield being held in place by means of a pressure spring 26 of the form and arrangement, as shown.

Coupled to the lower end of the inlet pipe 8 and disposed within the upper portion of the tank 1 is a perforate straining member or nozzle 27 provided with numerous openings or perforations 28, through which the gas will flow during its passage from the pipe 8 into the tank.

In practice, the gas is, by opening the valve 12, admitted through the pipe 8 into the upper portion of the tank which is previously filled with liquid to the level indicated by the dotted line in the drawing, it being understood that the tank is completely charged with gas above the liquid. By operating the agitator 3, through the medium of the crank shaft 6, the liquid becomes charged or impregnated with the gas. By closing the valves 21 and 24 and opening the valves 19 and 22, the liquid will under pressure of the gas, be forced outward through the spraying pipe 17 for distribution through the nozzle 18 onto the trees or plants to be sprayed. During its entrance into the tank, the gas which flows under comparatively high pressure, passes through the openings 28 of the nozzle 27, whereby the force or pressure of the gas is broken and prevented from impinging upon and agitating the liquid contents of the tank. During the spraying action, the liquid flowing from the tank passes through the strainer 25 before entering the tube 17 and in the event of said strainer becoming fouled and choked, and thus affecting proper flow of the liquid, the strainer 25 may be readily cleaned by closing valves 19 and 22 and opening valves 21 and 24, thus allowing the gas from the upper portion of the tank to flow under pressure through the branch pipe 23 backward through the strainer and thence outward through the pipe section 14 and cock 20, whereby the impurities will be blown off the strainer and out of the pipes, as will be readily understood.

In case the nozzle should become clogged, it can be cleaned by permitting the gas to flow therethrough by opening the valves 24 and 19 and closing valve 22.

Having thus described the invention, what I claim is:—

In a spraying apparatus, the combination of a gas-tight vessel adapted to contain a germicide liquid, means above the normal level of the liquid for supplying gas under pressure thereto for forcing liquid from the vessel during the spraying operation, an agitating means within the vessel, a pipe connected with the vessel adjacent the bottom thereof to receive liquid, a cut-off valve in the pipe, a drain valve connected with the pipe, a casing connected with the pipe at a point intermediate the valves, a strainer in the casing, a pipe connected with the casing to receive strained liquid therefrom, a cut-off valve in the last-mentioned pipe, a spraying device connected with the last-mentioned valve, a conduit connected with the vessel at a point above the normal liquid level and with the second-mentioned pipe at a point between the second cut-off valve and said casing, a valve in the said conduit for admitting gas through the casing in reverse direction to the flow of liquid when the cut-off valves are closed and the drain valve is open.

In testimony whereof, I affix my signature in presence of two witnesses.

ELI F. KAUFFMAN.

Witnesses:
HERBERT HILL,
JACOB E. WEAVER.